Nov. 30, 1943.  R. W. JOHNSON  2,335,418
METHOD OF MAKING TAPER PINS
Filed March 28, 1941
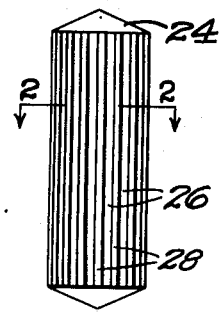
Fig.1.
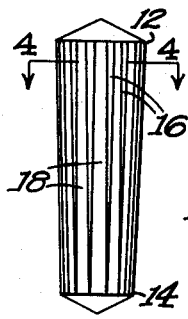
Fig.3.
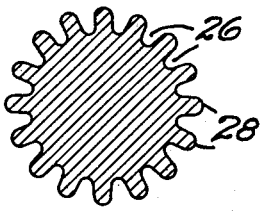
Fig.2.
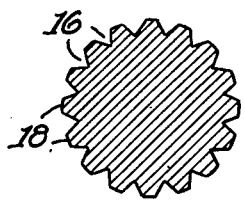
Fig.4.
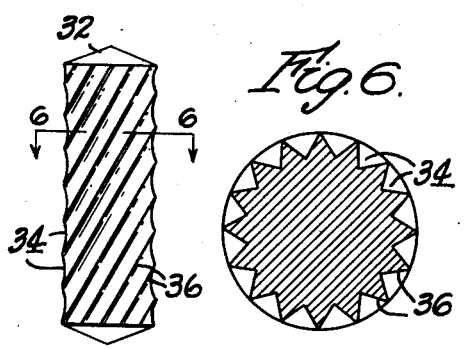
Fig.6.
Fig.5.
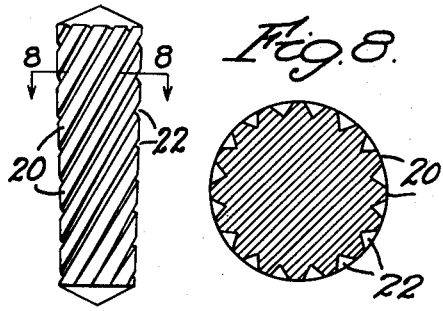
Fig.8.
Fig.7.
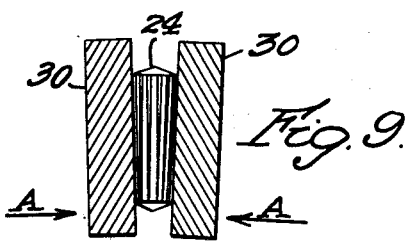
Fig.9.
Inventor
Russell W. Johnson
By attorney
Dean Fairbank & Hirsch Patented Nov. 30, 1943

2,335,418

UNITED STATES PATENT OFFICE 2,335,418

METHOD OF MAKING TAPER PINS

Russell W. Johnson, Worcester, Mass., assignor to Groov-Pin Corporation, Union City, N. J., a corporation of New York Application March 28, 1941, Serial No. 385,609

6 Claims. (Cl. 80—63)

This invention relates to methods of making taper pins of the type disclosed in my United States Patent No. 2,223,871, dated December 3, 1940.

Objects of the invention include the provision of a simple and inexpensive method of making taper pins having tapering grooves; the provision of such a method whereby a cylindrical pin is formed in taper by rolling or forging; the provision of a method wherein a cylindrical pin having substantially uniform grooves in its periphery is worked so as to displace at least some of the material of the lands into the grooves to narrow the latter and widen and finish the former; and the provision of a method of making a grooved taper pin by forming grooves and lands on a cylindrical pin and displacing material of the lands into the grooves to a greater extent gradually from one end of the pin to the other end thereof.

Other objects and advantages of the invention will appear hereinafter.

Reference is to be had to the accompanying drawing, in which

Fig. 1 is a side view of a cylindrical straight grooved wire;

Fig. 2 is an enlarged section on line 2—2 of Fig. 1;

Fig. 3 is a side view of one form of the finished pin;

Fig. 4 is an enlarged section on line 4—4 of Fig. 3;

Fig. 5 is a side view of a cylindrical helically grooved wire;

Fig. 6 is an enlarged section on line 6—6 of Fig. 5;

Fig. 7 is a side view of a finished pin made from the wire shown in Fig. 5;

Fig. 8 is an enlarged section on line 8—8 of Fig. 7; and

Fig. 9 is an illustration of the final step in the method.

The pin, which is made according to the present invention, may take several forms among which is that shown in Figs. 3 and 4. This pin tapers down from end 12 to end 14, and is provided with straight grooves 16 which gradually narrow from the wide to the small end of the pin. Conversely, lands 18 are narrow at the wide end and widen out toward the small end of the pin, to take up almost all of the pin periphery at this point.

Another form of taper pin is shown in Figs. 7 and 8, wherein lands 20 are narrow at the wide end and extend helically toward the small end of the pin while widening, to take up most of the pin surface area at this end. Grooves 22 are, of course, also helical and gradually narrow toward the pin's smaller end. The advantage of the taper pins disclosed are brought out in my patent above referred to.

In the manufacture of the pin, shown in Figs. 3 and 4, a length of cylindrical wire 24 is cut to length and is impressed with the straight parallel grooves 26, producing lands 28. If desired, a pinion wire similar to that shown can be bought on the open market and cut to length. In any case, the cylindrical grooved blank is then rolled between plane dies or plates 30, while more pressure is exerted at arrows A than at other points on the dies, or the latter can be rigidly held at the desired angle in a roll screw-thread machine, and the latter operated as usual. In either event, the action of the blank or plane dies will be to exert radial pressure on the grooved blank and this will displace the material of the lands into the grooves in such a manner that the grooves will narrow gradually from the larger to the smaller end of the pin, and conversely, the lands will be widened gradually as the outer diameter of the pin decreases. The root diameter of the pin, that is, the diameter determined by the troughs of the grooves increases gradually as the outer diameter of the pin decreases. This effect may be carried out to any greater or lesser extent desired.

The cylindrical pin blank 32 may be cut in a lathe or rolled between thread dies to produce the helical grooves 34, and lands 36 can be of any desired shape as well as the triangular form shown. Blank 32 is then rolled between the plane dies 30 as in the case of blank 24, and the grooves and lands will then appear as in Fig. 7. In this case also the outer diameter of the pin gradually decreases while its root diameter gradually increases from one end to the other.

In place of rolling, as illustrated in Fig. 9, blanks 24, 32 could be forced into a conical die having the shape and dimension of the desired finished pin. It is to be noted that the process depends mainly on displacing material from the parallel lands into the parallel grooves gradually to a greater extent from the large to the small end of the pin, and hence the invention is not primarily restricted to rolling or forging.

Having thus described my invention and the advantages thereof, I do not wish to be limited to the details herein disclosed, otherwise than as set forth in the claims, but what I claim is:

1. The method of making drive pins which consists in making from a round wire a grooved wire and then rolling the grooved wire to reduce it in diameter and applying more pressure at one end than at the other to reduce the diameter more at one end than at the other and smooth off the excess between the grooves so that they will form at any point along the pin a conical surface interrupted only by the grooves which are partly filled in by the displaced metal.

2. The method of making drive pins which includes providing a cylindrical blank with parallel sided grooves, and exerting pressure radially on the blank to a gradually increasing extent from one end of the blank to the other, thus displacing material between grooves thereinto to an increasing extent along the blank to gradually narrow the grooves, and lessen the diameter of the blank.

3. The method of making drive pins which includes the steps of providing a length of pinion wire, applying pressure to said wire, and rendering the pressure gradually greater from one end of the wire to the other, to thereby gradually reduce the widths of the grooves in the wire and correspondingly reduce the diameter thereof.

4. The method of making drive pins including the steps of longitudinally grooving a generally cylindrical blank, and displacing material between grooves partially thereinto to a relatively small degree adjacent one end of the blank and to a gradually increasing degree towards the other end of the blank, thereby narrowing the grooves and reducing the outer blank diameter and increasing the root diameter toward said other end.

5. The method of making drive pins including the steps of providing helical grooves in the surface of a generally cylindrical blank, and displacing material between grooves partially thereinto, to a relatively small degree adjacent one end of the blank and to a gradually increasing degree toward the other end of the blank, thereby narrowing the grooves and reducing the outer blank diameter and increasing the root diameter toward said other end.

6. The method of making drive pins including the provision of a generally cylindrical blank having generally parallel sided grooves therein extending substantially from end to end of the blank, and gradually reducing the widths of said grooves, and the outer diameter of the blank and increasing the root diameter from end to end thereof.

RUSSELL W. JOHNSON.